Figure 21:
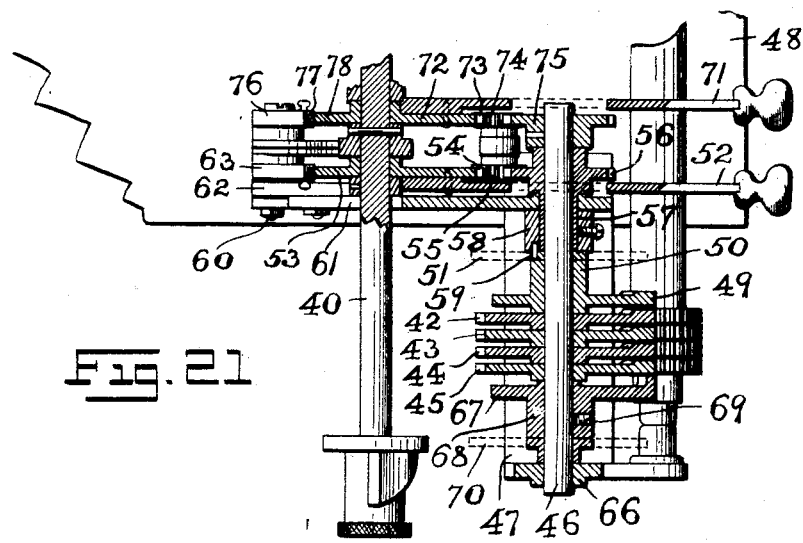

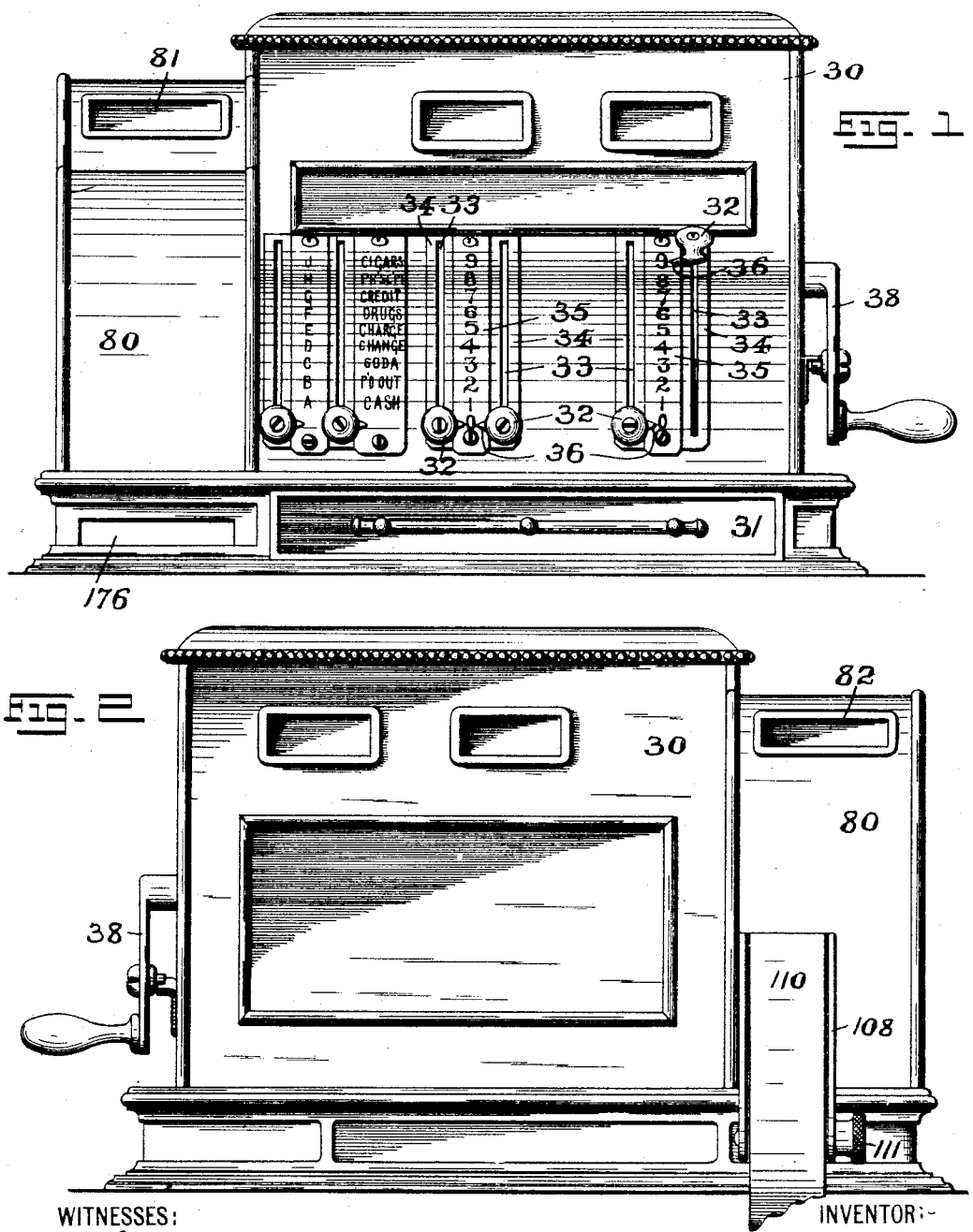

No. 790,075. PATENTED MAY 16, 1905.
A. PFAFF.
CASH REGISTER.
APPLICATION FILED APR. 25, 1903.

12 SHEETS—SHEET 2.

FIG. 3

WITNESSES:
Arthur Marion.
Anna V. Broderick.

INVENTOR
Albert Pfaff
BY
Chas. C. Gill
ATTORNEY

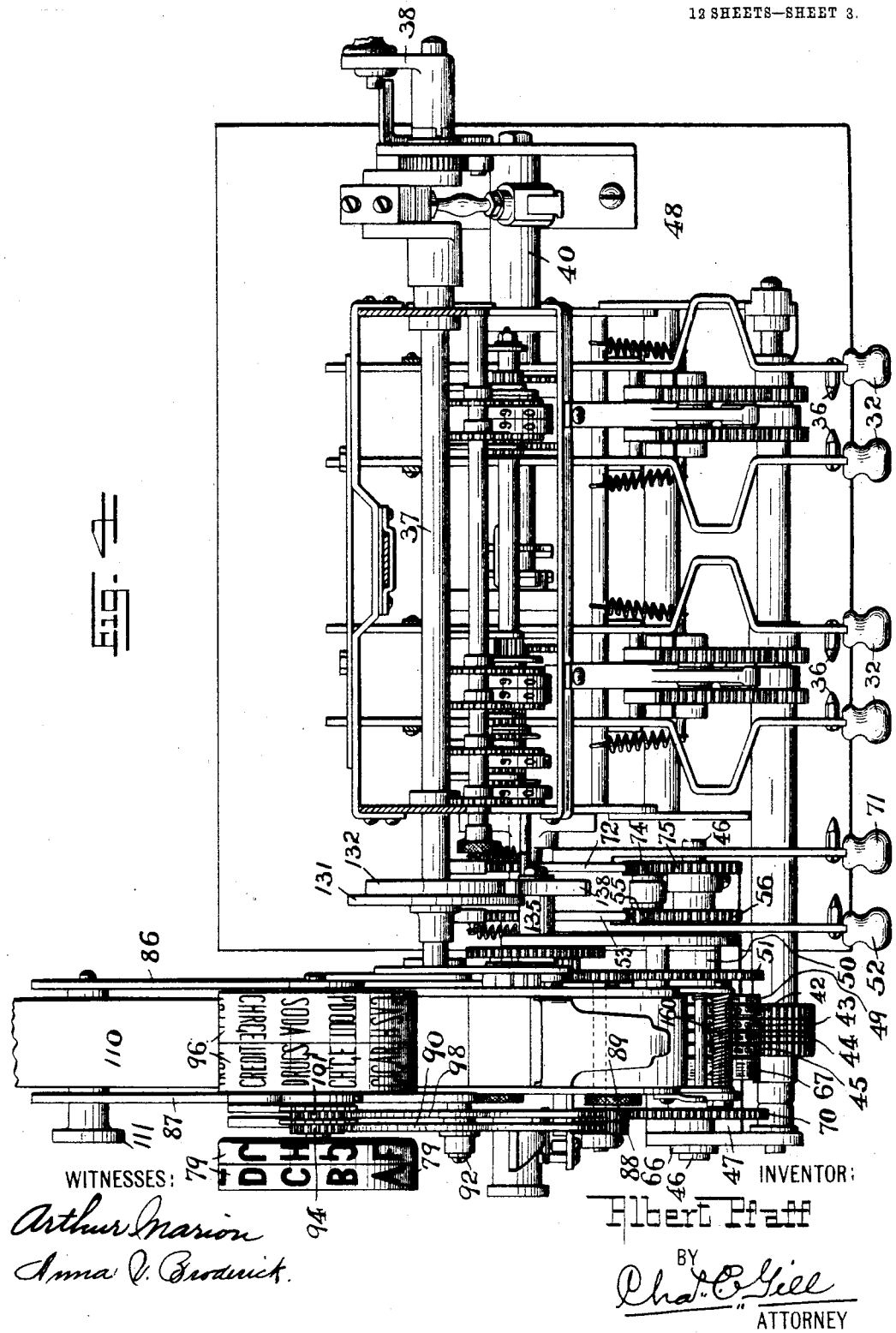

No. 790,075. PATENTED MAY 16, 1905.
A. PFAFF.
CASH REGISTER.
APPLICATION FILED APR. 25, 1903.
12 SHEETS—SHEET 4.
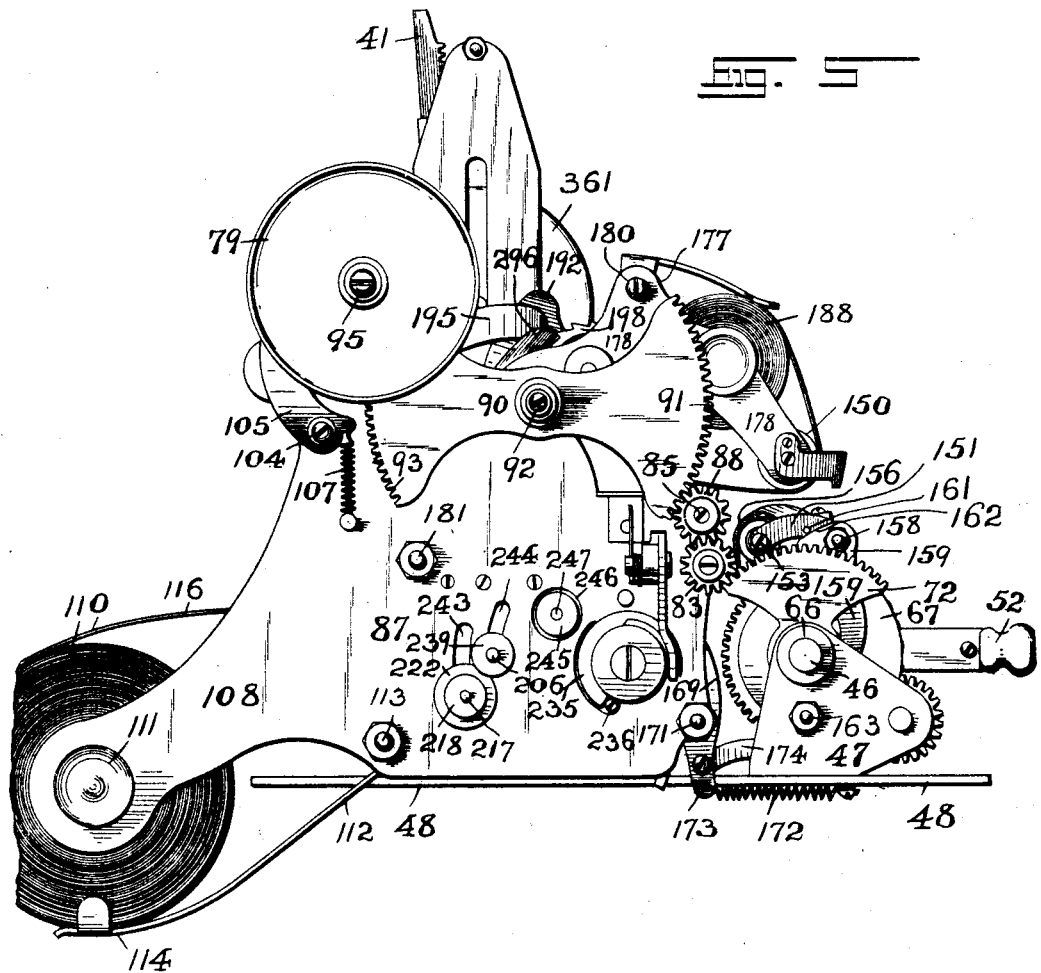
WITNESSES:
Arthur Marion
Anna V. Broderick
INVENTOR:
Albert Pfaff
BY
Chas. C. Gill
ATTORNEY

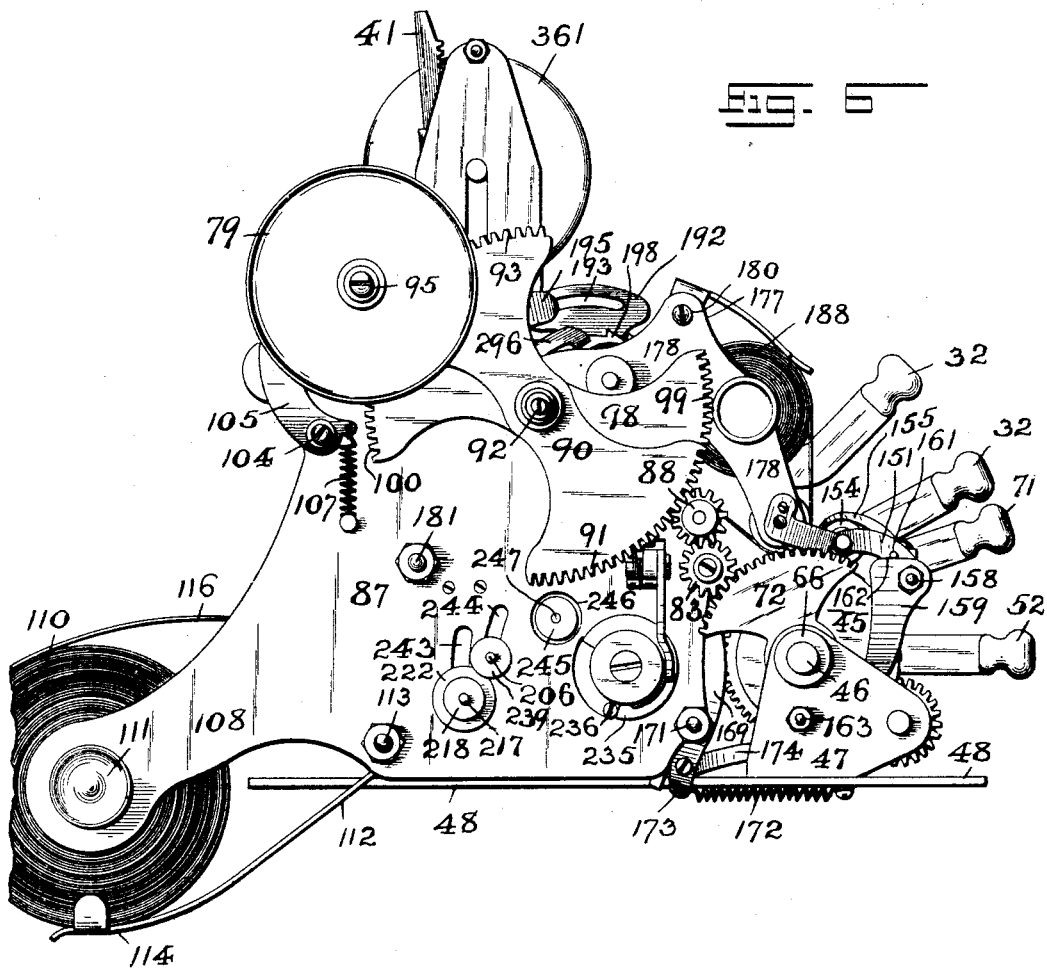

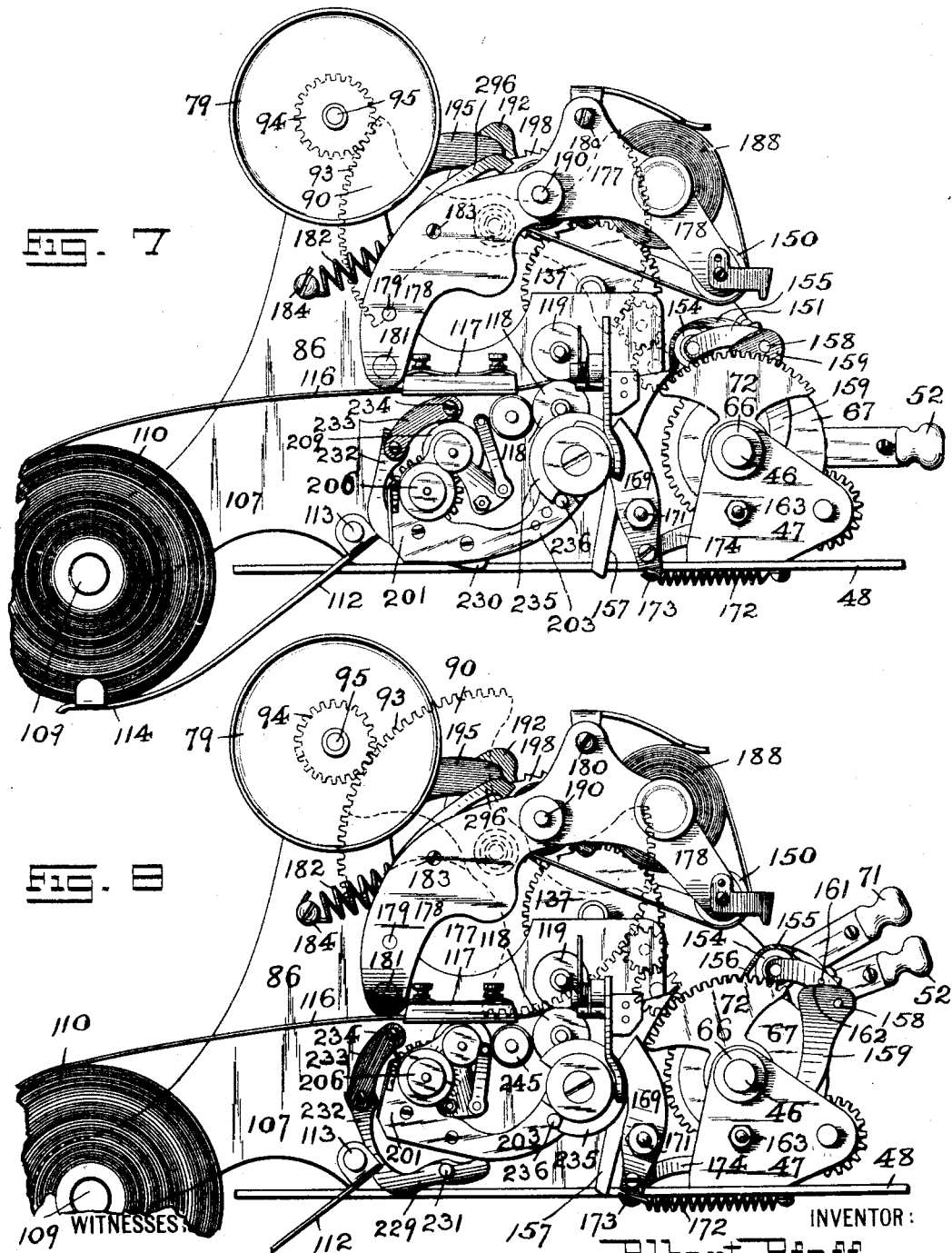

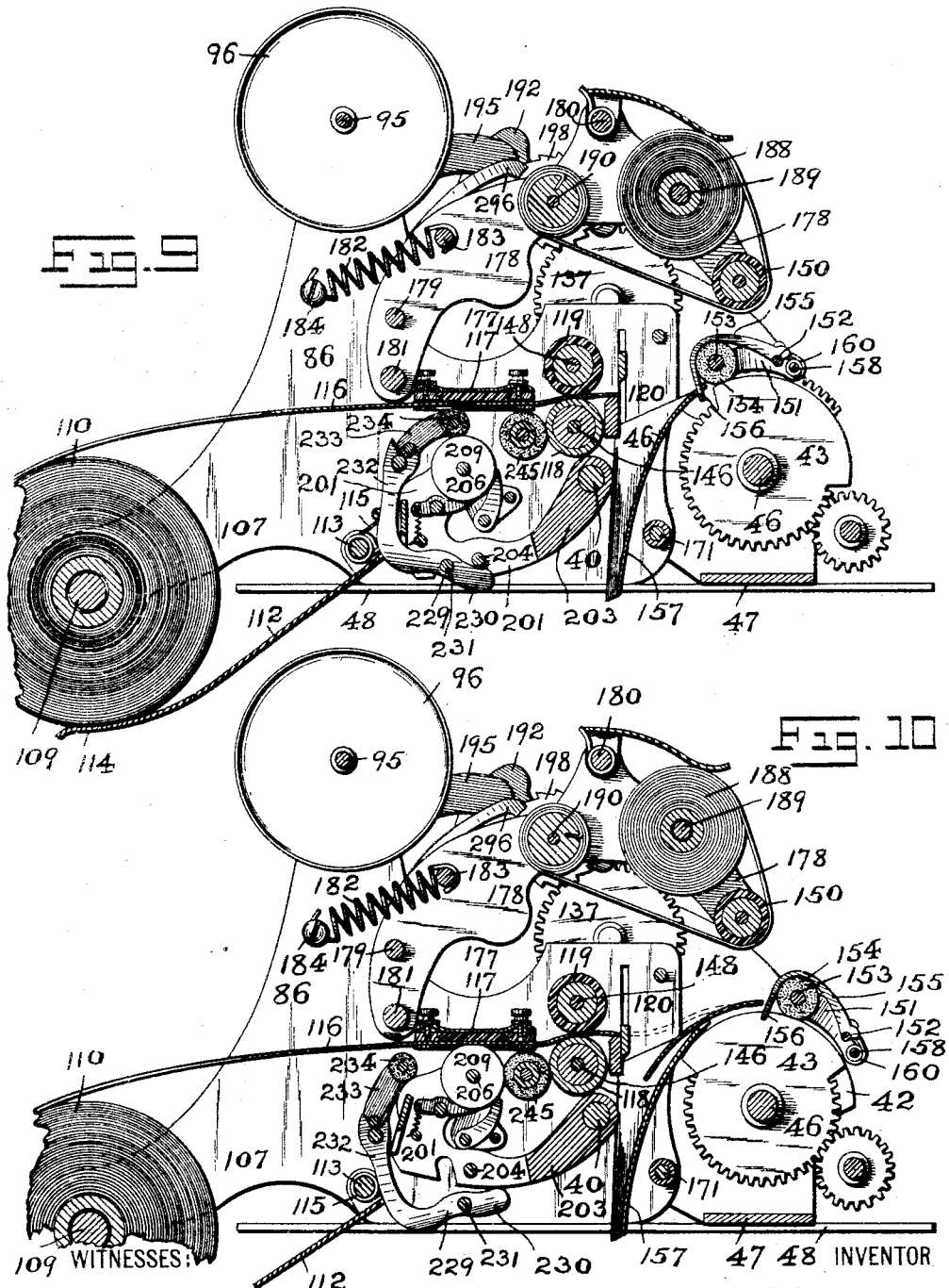

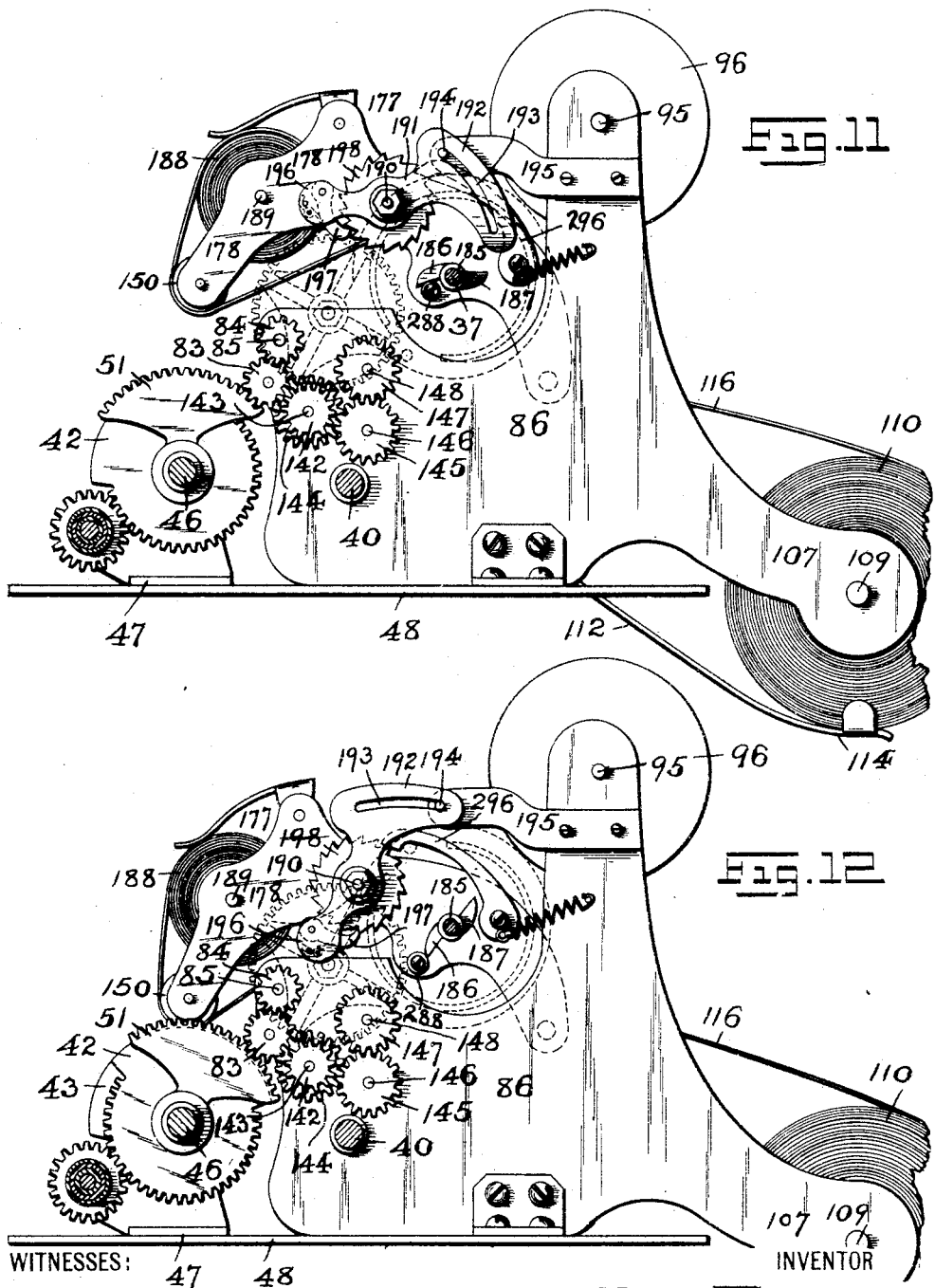

No. 790,075. PATENTED MAY 16, 1905.
A. PFAFF.
CASH REGISTER.
APPLICATION FILED APR. 25, 1903.
12 SHEETS—SHEET 9.
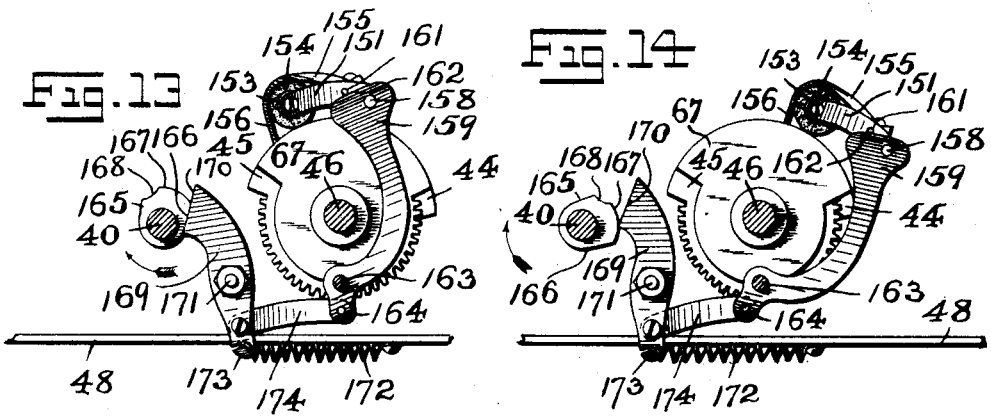
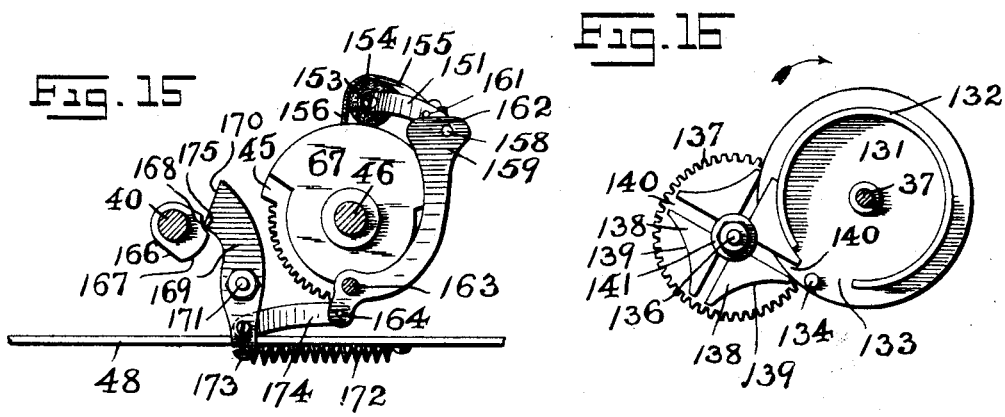
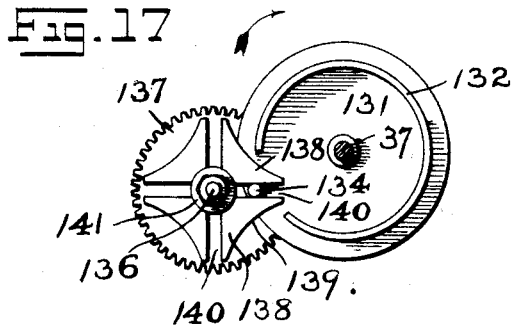
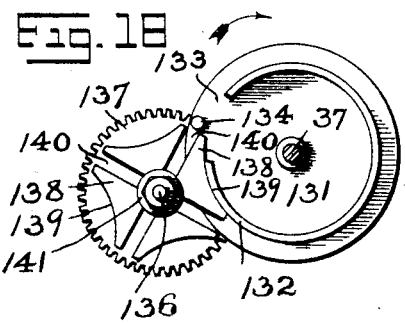
WITNESSES:
Arthur Marion
Anna V. Broderick
INVENTOR
Albert Pfaff
BY
Chas. E. Gill
ATTORNEY

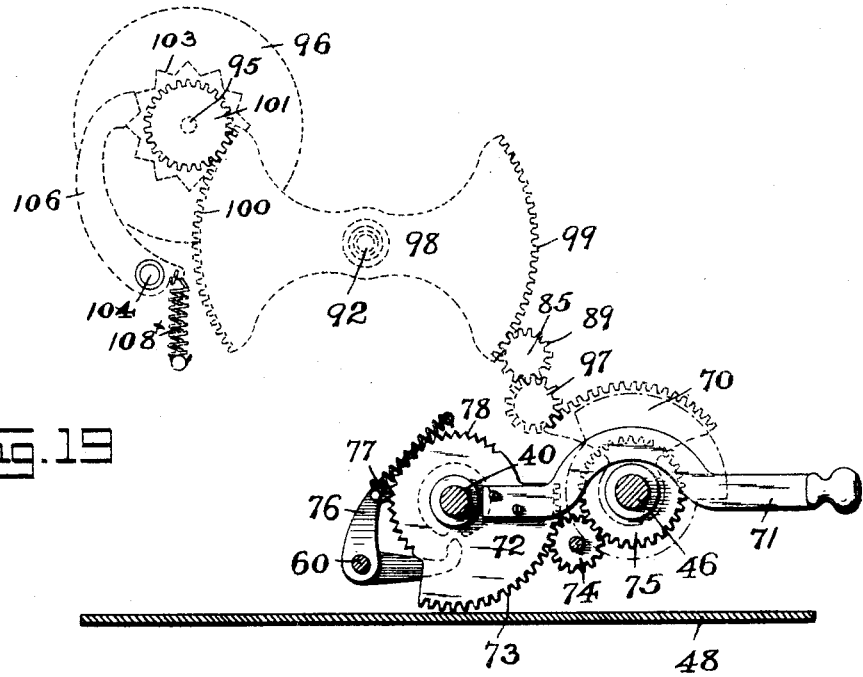
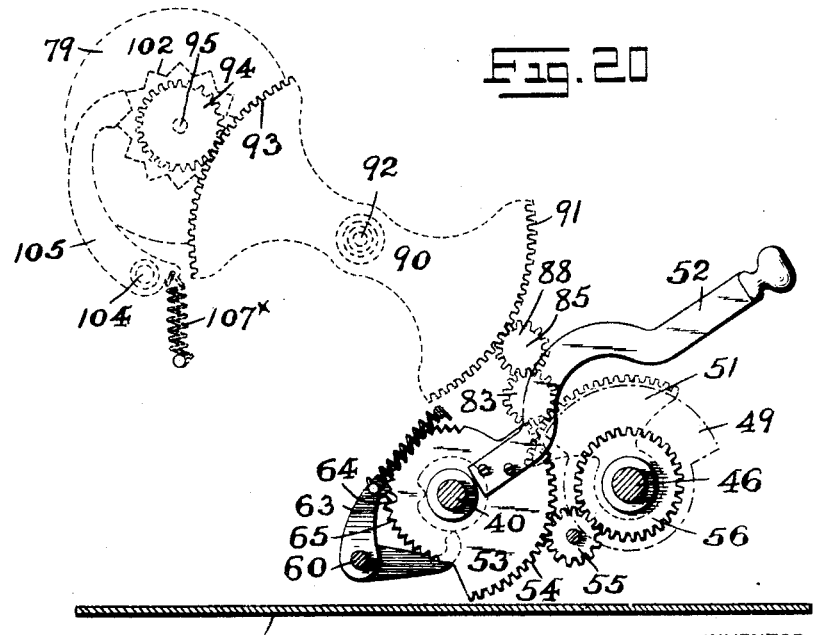

No. 790,075. PATENTED MAY 16, 1905.
A. PFAFF.
CASH REGISTER.
APPLICATION FILED APR. 25, 1903.

12 SHEETS—SHEET 11.

WITNESSES:
Arthur Marion.
Anna V. Broderick.

INVENTOR
Albert Pfaff
BY
Chas. C. Gill
ATTORNEY

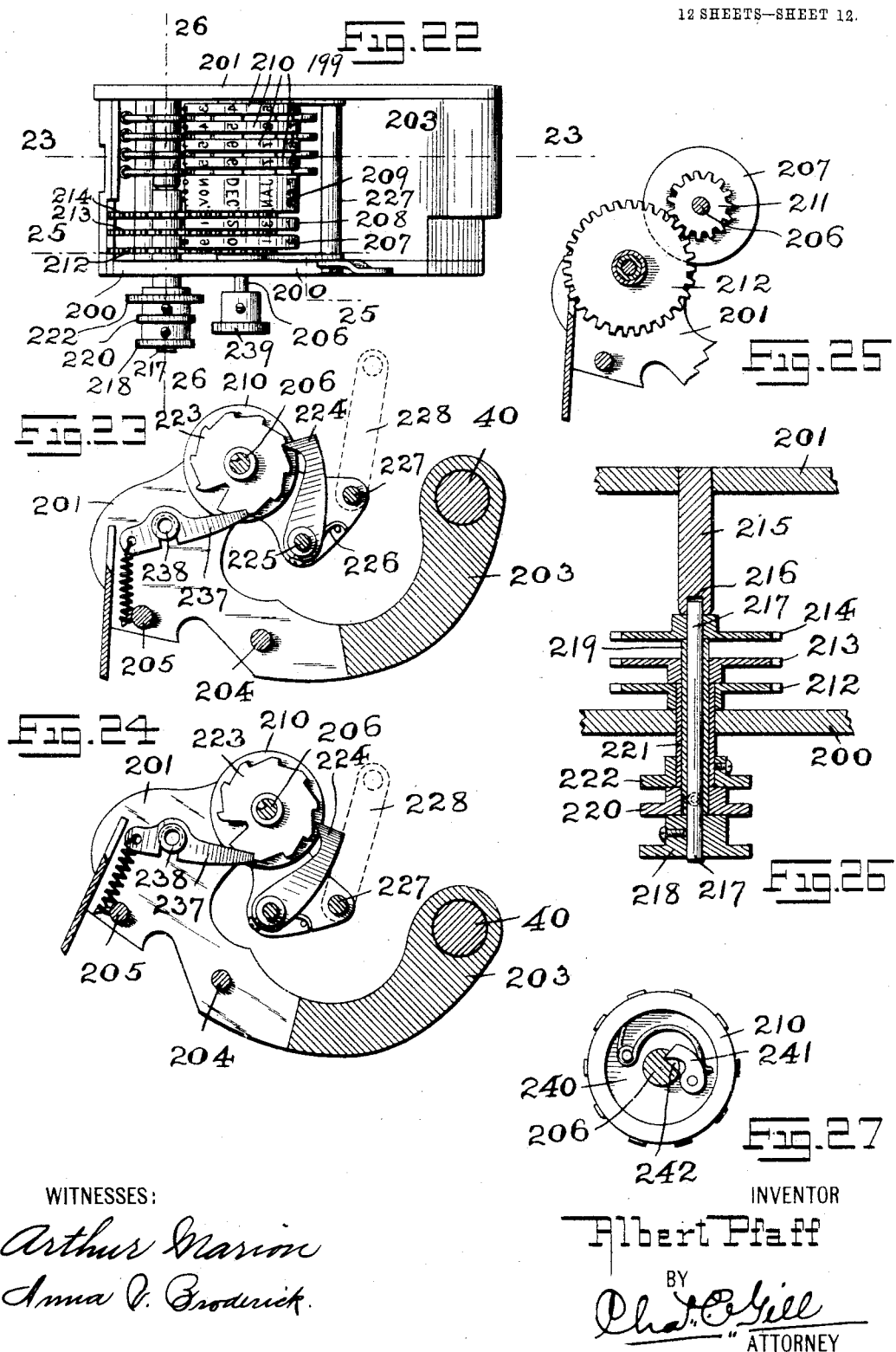

No. 790,075.

Patented May 16, 1905.

UNITED STATES PATENT OFFICE.

ALBERT PFAFF, OF NEWARK, NEW JERSEY, ASSIGNOR, BY MESNE ASSIGNMENTS, TO NATIONAL CASH REGISTER COMPANY, OF JERSEY CITY, NEW JERSEY, A CORPORATION OF NEW JERSEY.

CASH-REGISTER.

SPECIFICATION forming part of Letters Patent No. 790,075, dated May 16, 1905.

Application filed April 25, 1903. Serial No. 154,202.

*To all whom it may concern:*

Be it known that I, ALBERT PFAFF, a citizen of the United States, and a resident of Newark, in the county of Essex and State of New Jersey, have invented certain new and useful Improvements in Cash-Registers, of which the following is a specification.

The invention hereinafter described relates to improvements in cash-registers of the character set forth and illustrated in Letters Patent to E. S. Smith and H. Giles, No. 677,896, issued July 9, 1901, in which the operator moves the exposed actuating or setting levers along lines of numerals provided upon the front face of the cash-register for the purpose of setting certain interior segments into proper operative relation to the registering mechanism, and thereafter the operator by moving an exposed handle or crank places the gearing of the registering mechanism into direct engagement with said segments and effects the movement of said segments to their normal positions, whereby they are caused to operate the registering mechanism to the extent desired.

The present invention, furthermore, is in the nature of improvements to be applied to and employed with the construction of cash-registers set forth in my Letters Patent dated March 3, 1903, Nos. 721,915 and 721,916.

The principal objects of my present invention therefore are to provide with mechanism of the character above specified a novel and improved means controlled or actuated by the said register mechanism, first, for printing upon a tape or roll of paper the various amounts to be registered; secondly, for printing upon and delivering from the cash-register a check or ticket bearing upon its one side or face various inscriptions, such as the amount registered, the date of sale, the number or initial of the clerk who made the sale, the department of sales or kind of goods sold, and an advertisement or other suitable reading matter.

The present invention therefore consists in the novel features, structures, and combinations of the various devices and the operating mechanism hereinafter more particularly set forth, as well as in the various details of the construction of the parts of the same, all of which will be fully described in the following specification, and finally embodied in the clauses of the claim which are appended to and form a part of this specification.

The invention is clearly illustrated in the accompanying drawings, in which—

Figure 28:
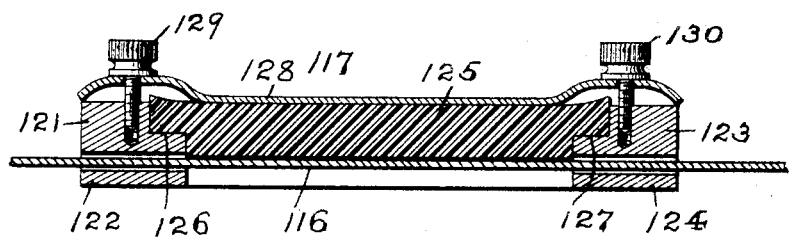

Figures 1 and 2 are a front and rear view, respectively, of a cash-register constructed according to and embodying the principles of the present invention. Fig. 3 is a front elevation of the various interior mechanism in their normally inoperative positions, representing the same upon a base or shelf by means of which the mechanism is arranged within the casing of the cash-register, the said casing, however, being omitted. Fig. 4 is a part plan or top view and part horizontal section of the apparatus directly below the indicating cylinders or drums, the said view illustrating the registering mechanism, the actuating or setting levers, the recording-tape device, the ticket-printing mechanism, and intermediately-placed operating devices—such as the segments, gears, and operating spindles—all in plan or top view. Fig. 5 is a side view of the apparatus looking in the direction of arrow *x* in Fig. 3, the parts being shown in their normal initial positions; and Fig. 6 is a similar view of the mechanism represented in said Fig. 5, illustrating the various parts of the mechanism in their actuated positions, both of said views illustrating the general arrangement of the mechanism back of the outer side plate at the left of the apparatus. Figs. 7 and 8 are views similar to Figs. 5 and 6, respectively, with the said side plate removed. Fig. 9 is a transverse vertical section taken on line 9 9 of Fig. 3 of the drawings, representing the various devices in their normal initial positions; and Fig. 10 is a similar section of the same devices, but representing the card printing and delivery mechanism in their operated positions. Fig. 11 is a transverse vertical section taken on line 11 11 in said Fig. 3, but looking in the direction of the arrow y; and Fig. 12 is a similar section of the same mechanism, but representing the various parts in their actuated positions. Figs. 13, 14, and 15 are side views of the tape-printing device in its normal initial and two of its operated positions, respectively; and Figs. 16, 17, and 18 are side views in detail of certain devices for actuating the ticket printing and delivery mechanism, said views representing the various steps of operation of the said devices. Fig. 19 is a side view of certain means in its normal initial position for setting the printing-dial bearing the department and similar designating insigna, certain other mechanism for indicating the same insignia upon a rotatable drum and actuated at the same time that said dial is set, being indicated in dotted outline; and Fig. 20 is a similar view of a similarly-constructed mechanism in its actuated position for setting the printing-dial bearing the clerk-indicating insignia, certain other mechanism for indicating the same insignia upon a rotatable drum and actuated at the same time that said dial or disk is set, being indicated in dotted outline; and Fig. 21 is a horizontal sectional representation in detail of the various printing-disks and a pair of setting-levers and parts connected therewith. Fig. 22 is a plan view of a pivotally-arranged printing device for printing the date and numbers of the sales in their consecutive order upon the ticket or card. Fig. 23 is a vertical section taken through line 23 23 in said Fig. 22, the parts being represented in their normal initial positions; and Fig. 24 is a similar view of the same parts, but representing the numbering-wheel about to be actuated. Fig. 25 is a detailed vertical section taken on line 25 25 in said Fig. 22. Fig. 26 is a transverse vertical section taken on line 26 26 in said Fig. 22; and Fig. 27 is a side view of one of the said consecutive number-wheels; and Fig. 28 is a longitudinal vertical section, on an enlarged scale, of a tape-guiding device.

Similar characters of reference are employed in all of the said hereinabove-described views to indicate corresponding parts.

Referring now to the several figures of the drawings, the reference character 30 designates the exterior shell or casing of the cash-register, and 31 is the usual cash-drawer.

The main actuating or setting levers are designated by the numeral 32 and said levers extend forward through slots 33, formed in the front plate or plates 34 of the register, the said plate or plates being furnished with the columns of numerals 35, ranging from "0" to "9," inclusive. Each actuating or setting lever 32 is provided at or near the point where it projects from the slot 33 with an index hand or pointer 36, extending in a lateral direction and sliding directly in front of the column of numbers 35, so that the operator may know at what point or opposite what number in the column the actuating-lever is to be set.

The initial position of each main actuating or setting lever 32 is at the lower end of its slot 33, and when it is desired to register and indicate the amount of a sale the said lever (or more of them, as may be necessary,) will be moved upward to proper positions along the line of said slots 33 under the guidance of the columns of numerals 35 on the front plate or plates 34.

The main indicating cylinders or drums are indicated by the reference character 361, and 37 is the main driving or operating shaft, which is actuated by means of a suitable handle or crank 38 and rotates in bearings in the frame 39.

The general arrangements and construction of the mechanism—such as the segments arranged upon a shaft 40, which is oscillated by the rotary action of the shaft 37, and the racks 41, which actuate or set the indicating drums or cylinders 361 and other coöperating devices and mechanism—are fully illustrated and described in said previously-mentioned Letters Patent No. 677,896, and the mechanism for setting the printing disks or dials 42, 43, 44, and 45 for printing the amount of the sales upon the ticket or tape and the manner of actuating the said disks or dials by means of the arrangement of tubular spindles and trains of gears is that illustrated and described in my previous Letters Patent No. 721,915, dated March 3, 1903. Hence it will not be necessary to more fully describe said mechanisms and operations herein, except to say that said printing disks or dials 42, 43, 44, and 45 oscillate independently of each other upon a pin or rod 46, connected with a bracket 47, which is secured upon the base 48, and is provided with a frame-plate 61, with which the other end of said pin or rod 46 is suitably connected. These printing disks or dials 42, 43, 44, and 45 are arranged upon the said pin or rod 46, preferably in the manner illustrated in Fig. 21 of the drawings, the said disks rotating independent of each other upon said pin or rod 46, as will be clearly understood from an inspection of said figure. Upon the said pin or rod 46 at the right side of the printing disk or dial 42 and having a rotatable movement independent of said pin or rod 46 is a printing disk or dial 49, bearing upon its printing-surface letters or other insignia signifying the clerk who has made the sale. This disk or dial 49 is made with a laterally-extending hub 50, having an upwardly-extending toothed sector 51, said sector 51 forming an integral part of the said hub 50, or being soldered fast thereto, or being connected with the said hub 50 in any other suitable manner. The said dial or disk 49 is actuated and set from a setting-lever 52, which is connected with a toothed sector 53, loosely mounted upon the main shaft 40. This sector 53 is made with the gear-teeth 54, which mesh with a toothed idler 55 in engagement with a gear-wheel 56, provided with a long hub 57 and loosely mounted upon the said rod or pin 46. Upon said hub 57 I have secured a sleeve or collar 58, and 59 is a key, pin, or other suitable means of connection between the said sleeve or collar 58 and the hub 50 of the dial or disk 49, whereby, as will be clearly evident, the said dial or disk 49 is actuated by the raising and lowering of the setting-lever 52 without actuating any other disks or dials upon the rod or pin 46. To hold or retain the said setting-lever 52 in any one of its raised positions, and thereby retaining the disk or dial 49 in its printing position against accidental displacement, I have arranged upon a pin 60, which extends laterally from an arm 62 or other part of the frame-plate 61, a spring dog or pawl 63, having a sharp holding portion 64, which is in slidable holding engagement with V-shaped teeth 65, formed on a portion of the said sector 53, as shown. Upon the same rod or pin 46 at the left and between the printing-disk 45 and the bearing portion 66 of the bracket 47 is a printing-disk 67, the same having on a portion of its peripheral surface such characters which will print the words "Cigars," "Groceries," "Charge," "Department," and, in fact, any other word or words of a similar character. This printing-disk 67 has a hub 68 and is secured directly to the pin or rod 46 by means of a set-screw 69 or other suitable fastening means. The said hub 68 is also provided with a toothed sector 70 similar to the sector 51, hereinabove mentioned, the purposes of these sectors being hereinafter set forth. The said dial or printing disk 67 is actuated and set from a setting-lever 71, which is connected with a toothed sector 72, loosely mounted upon the main shaft 40. This sector is provided with the gear-teeth 73, which mesh with a toothed idler 74 in engagement with a gear-wheel 75, suitably fixed upon a portion of the previously-mentioned rod or pin 46. It will thus be seen by raising and lowering the said setting-lever 71 that by this mechanism the said pin or rod 46 is oscillated in its bearings, the said pin or rod thereby setting the printing-disk 67 at the point desired. To hold or retain the said setting-lever 71 in any one of its raised positions, and thereby retaining the disk or dial 67 in its printing position against accidental displacement, I have arranged upon the previously-mentioned pin 60 a second spring dog or pawl 76, having a sharp holding portion 77, which is in slidable engagement with V-shaped teeth 78, formed upon a portion of the said sector 72.

Before describing the construction and action of the inking-pad for supplying the disks 42, 43, 44, 45, 49, and 67 with ink and also the mechanisms for feeding the check-strip and for cutting off, printing, and delivering the printed check or ticket I will now set forth the use of the sectors 51 and 70 and the mechanism actuated from said sectors.

Referring now to Figs. 5, 6, and 20, it will be noticed that the purpose of the sector 51 is to actuate an intermediately-placed mechanism for actuating or setting a drum or indicating cylinder 79, bearing the same insignia or symbols as those upon the clerk-printing disk or dial 49, the insignia or symbols upon said drum or cylinder being arranged side by side in two rows, so as to be read through the windows 81 and 82 in the opposite sides of the casing portion 80 of the cash-register, as will be clearly understood.

The movement of the segment 51 when the setting-lever 52 is moved actuates an idle gear 83, which is in mesh with the teeth of said segment 51, this gear meshing with a pinion 84, fixed upon a spindle 85, rotatively arranged in suitably-disposed bearing portions in a pair of suitably-arranged frame-pieces 86 and 87. This spindle extends from the side of said frame-piece 87, and said end of the spindle has arranged thereon a pinion 88 and a loose pinion 89. In mesh with the teeth of said fixed pinion 88 is the segmental toothed portion 91 of an oscillating member 90, said member being pivotally arranged upon a stud or post 92, extending from the side of the frame-piece 81 and having a second segmental toothed portion 93. The said segmental toothed portion 93 is in mesh with the gear-teeth of a pinion 94, loosely arranged upon a spindle or rod 95, the previously-mentioned drum or indicating cylinder 79 being suitably connected with the said pinion 94, so as to be operated from the same when said pinion 94 is actuated by means of the oscillating member 90.

The purpose of the sector 70 is to actuate an intermediately-placed mechanism for actuating or setting a drum or indicating cylinder 96, bearing the same insignia or words as those upon the printing disk or dial 67, the insignia or symbols upon said drum or cylinder 96 also being arranged side by side in two rows, so as to be read through the windows 81 and 82 in the opposite sides of the said casing portion 80 of the cash-register.

The movement of the segment 70 when setting the lever 71 actuates an idle gear 97, which is in mesh with the previously-mentioned loose pinion 89 upon the spindle 85. In mesh with the teeth of said loose pinion 89 is the segmental toothed portion 99 of an oscillating member 98, said member being also pivotally arranged upon the said stud or post 92, extending from the side of the frame-piece 81. This oscillating member 98 is provided with a second toothed segmental portion 100, which is in mesh with the gear-teeth of a pinion 101, fixed upon the spindle or rod 95, on which the said drum or cylinder 96 is also secured, and is rotated when said spindle or rod 95 is actuated by means of said intermediately-placed mechanism from the said segment 70 and the setting-lever 71, as will be clearly understood.

To prevent the accidental displacement of the drums or indicating-disks 79 and 96 or to prevent their being turned too far, due to momentum, when actuated by their respective members 90 and 98, a star-wheel 102 is secured to the pinion 94, and a star-wheel 103 is secured to the pinion 101. Pivotally arranged upon a rod 104 are a pair of dogs or detents 105 and 106, a spring 107$^\times$, forcing the dog or detent 105 in slidable engagement with the star-wheel 102, and a spring 108$^\times$, forcing the dog or detent 106 in slidable engagement with the star-wheel 103. The actions of the said spring-controlled dogs are such that the rotary movements of the pinions 94 and 101 and the cylinders 79 and 96 will not be interfered with while being set, but will hold said set drums or cylinders against accidental displacement. In like manner when the setting-levers 52 and 71 are returned to their normal initial positions then said drums or indicating-cylinders are also returned to their normal initial positions, the said dogs or detents 105 and 106 not interfering with the return movements of the various parts.

Having thus described the various printing devices for printing the sale, the number or symbol of the clerk, and the department or similar insignia by means of the printing-disks 42, 43, 44, and 45, 49 and 67 upon the tape or upon a ticket, I will now describe the mechanism for producing the tickets and for presenting such tickets to the said printing-disks and the means for ejecting the tickets.

Referring more particularly to Figs. 4, 7, 8, 9, 10, 11, and 12, respectively, of the drawings, the two frame-pieces 86 and 87 are provided with oppositely-placed and rearwardly-extending arms or members 107 and 108, having bearings in which is rotatively arranged a rod or spindle 109, carrying a roll of check-paper 110. The said rod or spindle 110 is provided at one end with a suitable finger-piece 111 in the form of a nut which can be unscrewed to permit of the removal of said rod or spindle 109 for the placing of a second roll of paper thereon when the first roll of paper has become exhausted. A guard or plate 112, pivotally secured upon a pin 113, has its forward end portion 114 constantly forced in contact with the under surface of said roll of paper by the action of a coiled spring 115 to prevent the paper from unreeling too rapidly while it is being pulled forward to be cut into a ticket. As will be seen more particularly from Figs. 9 and 10 the free end portion 116 of the paper is fed into a guiding device 117 and between a printing-roll 118 and guide-roll 119 and to a cutter or severing device 120. The said guide device 117, as will be seen from its enlarged representation in Fig. 28 of the drawings, comprises two pair of guide-bars 121 and 122 and 123 and 124, suitably secured between the frame-pieces 86 and 87 and between which the paper is passed beneath a backing 125, of a flexible and preferably plastic material, such as rubber, said backing being supported upon shoulders 126 and 127, formed, respectively, upon the guide-bars 121 and 123. A plate 128 of spring metal is arranged above the said backing to retain it in its operative position, said plate 128 being held in place by means of screws 129 and 130 or other suitable holding means. By means of these screws the tension of said spring-plate 128 against the backing 125 may be varied as circumstances may require. When these parts are in their normally inoperative positions, (indicated in said Fig. 9,) then the entire mechanism of the complete cash-register is at rest; but when the main shaft 37 is actuated by the turning of the handle or crank 38 then the said printing-roll 118 and guide-roll 119 are rotated, thereby pulling the paper between said rolls and beneath the raised knife or cutter 120 to the set printing-disks 42, 43, 44, 45, 49, and 67 to be printed upon and then to be severed into a check or ticket by the descending knife-blade of the cutter.

The means for actuating the rolls 118 and 119 consists, essentially, of a disk 131, which is suitably fixed upon the main shaft 37, the said disk 131 being provided with a laterally-extending annular flange 132, having a broken-away or open part 133, so as to form a nearly complete circle. At a suitable point upon a radial line passing centrally through the said open space or part 133 and upon a circle of greater diameter, but concentric with said annular flange 132, is a laterally-extending post or stud 134. Upon the previously-mentioned frame-piece 61 is a hub 135, which provides a bearing for a spindle or bolt 136, said spindle or bolt 136 having secured thereon at one end, preferably to the left of the frame-piece 61, a gear 137, and secured upon said spindle or bolt 136, to the right of said bearing-hub 135, is a hub 141, provided with four radially-extending wings 138, having the concaved marginal edges 139 and the radially-extending slots or open portions 140 between said wings in the manner of a Maltese cross, all of which is clearly illustrated in Figs. 16, 17, and 18 of the drawings. From an inspection of said last-mentioned figures it will be clearly understood that while the main shaft 36 and the disk 131 make one complete revolution the said hub 141 and its wings 138 or Maltese wheel and the gear 137 will make but a quarter-revolution, remaining at rest while the disk 131 moves from the position indicated in Fig. 18 to its normal initial position (represented in Fig. 16) in the manner and for the purposes to be presently described.

Referring now to Figs. 11 and 12, the said gear 137 (indicated in dotted outline) meshes with a pinion 142, arranged upon a short spindle or stud 143, which it rotates, thereby rotating a second pinion 144 upon said spindle or stud 143, which meshes with a pinion 145. This pinion 145 is secured upon the spindle 146, which carries the printing-roll 118, above mentioned, and said pinion 145 also meshes with a pinion 147, secured upon a spindle 148, which carries the previously-mentioned feed-roll 119. By this means the two rolls 118 and 119 are turned, and while the printing-roll 118 is providing the check-strip with an advertisement or other printed matter the paper is also fed above the set printing-disks a sufficient distance to permit a presser roll or bar 150 to press said portion of the paper upon the set printing-disks, and thereby print upon the same. All this occurs while the stud or projection 134 upon the disk 131 passes from the position indicated in Fig. 16 between two of the wings 138, thereby causing the Maltese wheel to assume the position shown in Fig. 17 and leaving it at rest in the position represented in Fig. 18.

Previous to the feeding of the paper upon the set printing disk or disks an inking device (illustrated more particularly in Figs. 3, 9, 10, 13, 14, and 15) is caused to pass over the printing-surfaces of said disks. This device consists, essentially, of a frame comprising a pair of side pieces 151, a connecting bar or rod 152, and a rod 153, upon which is an inking roll or pad 154. Suitably secured upon the bar or rod 152 is a forwardly-projecting arm 155, having an end or finger 156, which extends down between two of the adjacent printing-disks, as 43 and 44, the purpose of said finger 156 being to act as a stop to prevent the end of the paper from going too far over the printing-disks and also serving to force the severed ticket into a delivery-chute 157, (see Fig. 10,) when the said printing device moves from its actuated positions (indicated in Figs. 10, 14, and 15) to its normal initial position. (Represented in Figs. 9 and 13.) The two side pieces 151 are pivotally arranged upon a bolt or pin 158, extending from the side and upper end portion of a link or arm 159, a suitably-secured coiled spring 160, which encircles the said bolt or pin 158, forcing the said printing roll or pad 154 directly over the type-surface of the printing-disks as the device is moved in a forward and backward direction in the manner to be presently described. A stud or projection 161, extending laterally from one of said side pieces 151 and resting upon the edge 162 of the arm 159, regulates the degree of engagement of the printing roll or pad 154 with the printing-surfaces of said printing-disks. The said link 159 oscillates upon a pin 163, extending from the bracket 47, and has a downwardly-extending arm or finger 164. Upon the oscillating shaft 40 is secured a cam 165, having the straight edge 166, the curved edge 167, and the offset 168. Normally this flat edge 166 of the cam 165 rests against the straight edge 170 of an arm 169, pivotally arranged upon a pin or bolt 171, extending from the side of the frame-piece 87, the contact between said edges 166 and 170 being caused by the action of a spring 172, which is attached to the lower portion 173 of said arm 169 and to a part of the bracket-plate 47. A link 174 connects the arm or finger 164 with said lower portion 173 of the arm 169. Now when the shaft 40 is caused to move in the direction of the arrow indicated in Fig. 13 then the curved edge 167 of the cam 165 will cause a pivotal movement of the arm 169 upon the pin 171, whereby the link 174 pulls the arm 164 in a rearward direction and causes a correspondingly forward movement of the arm 159 and the inking device to the position represented in Fig. 14. The check or ticket at this time is being printed and severed. Immediately after such printing and severing of the ticket the edge 175 of the arm 169 forcibly drops into the offset 168 of the cam 165, thereby producing a slight jerky movement of the printing device and causing the finger 156 to strike the edge of the ticket and forcing it down into the chute 157, by which it is ejected from the casing of the cash-register through a suitable opening, as 176. The shaft 40 now moves back to its normal starting position, whereby the said parts (indicated in said Figs. 14 and 15) are returned to their normal initial positions. (Indicated in said Figs. 9 and 13 of the drawings.) The ticket-severing device is also actuated from the said shaft 40, and its construction is the same as that described in my aforesaid patent, No. 721,915, and hence need not be further described here.

The previously-mentioned presser-bar 150 for pressing the end of the paper to be printed thereon upon the printing-surfaces of the set printing-disks 42, 43, 44, 45, 49, and 67 is in the form of a roller journaled between the forward end portions of a pair of side pieces 178 of a cradle 177, as clearly illustrated in the various figures of the drawings. Suitable tie bolts or rods 179 and 180 are employed for connecting the said side pieces 178, the said cradle 177 being pivoted upon a cross-rod 181 and being capable of oscillation between the frame-pieces 86 and 87, with which said rod 181 is connected, the said cradle being lifted into its normally raised position by a spring 182, which has its respective ends attached to a rod 183 of said cradle and to a pin 184 on the frame-piece 86. The double downward movements of said cradle—first, for pressing the ticket to be printed upon the set printing-disks, and, secondly, for pressing a tape or detail-strip to be printed upon the said set printing-disks—are produced by a double cam 185, which is secured upon the main shaft 37. This cam, as will be seen from an inspection of Figs. 11 and 12, has two wings 186 and 187, both of which are brought at every half-turn of the main shaft 37 against a roller 288 or other device upon the side of the cradle 177, whereby the cradle, and especially the presser-roll 150, is twice lowered—first, to press the ticket against the printing-disks, and, secondly, to press a tape, to be presently described, against said printing-disks.

The tape or detail-strip for printing thereon for recording in consecutive order the various amounts of sales to be made, the initials or numbers of the clerks who made the sales, and the departments in which such sales were made is arranged in a roll 188 upon a removable pin or spindle 189 in said cradle 177, the said tape passing over the presser-roll 150 and then being reeled upon a receiving spindle or pin 190, also removably arranged in the said cradle 177. Referring again to Figs. 11 and 12, it will be seen that during the downward movement of the cradle 177 an arm 191, which is loosely arranged upon an end of the said spindle or pin 190, said arm having an extension 192, provided with a slot or opening 193, into which extends a pin or stud 194 on a fixed arm 195, connected with the frame-piece 86, causes said arm 191 to move on said spindle or pin 190, a member 196, forming a part of said arm 191, forcing a spring-actuated pawl or dog 197 against a tooth of a ratchet-wheel 198, secured to said pin or spindle 190, and thereby causing a movement of said tape. As soon as these parts return to their normal initial positions (indicated in Fig. 11) then the pawl or dog 197 slips back another tooth upon the ratchet-wheel 198 to again actuate the said wheel and the spindle or pin 190 during the next downward movement of the cradle 177, as will be clearly understood. In this manner the tape receives an intermittent movement, being unreeled from the spindle 189 and reeled upon the spindle 190, the printed matter in the meanwhile having been applied to the tape for record. A second spring-actuated pawl 296 prevents any backward motion of said ratchet-wheel 198.

In addition to the hereinabove-described devices there may be employed a dating device which is also provided with a set of disks bearing numbers for dating and numbering the tickets which are cut from the tape 110. This mechanism is represented more particularly in Figs. 7, 8, 9, 10, 22, 23, 24, 25, 26, and 27 of the drawings, and it consists, essentially, of a suitable frame 199, having the two side pieces 200 and 201 and a front wall 203, having a perforated portion 204, by means of which it is pivotally arranged upon the oscillating shaft 40 and between the two frame-pieces 86 and 87 and normally held by its own gravity in the positions indicated in Figs. 7 and 9. Between the said side pieces 200 and 201 are a pair of rods 204 and 205, and upon a pin 206 are rotatably arranged the date-printing disks 207 and 208, a disk 209 for printing the months, and a series of consecutive-number-printing disks 210. Between the various disks 207 and 208, 208 and 209 are intermediately placed pinions 211, the respective pinions 211 being actuated to set the proper dating-disks 207, 208, and 209 by hand from a set of gears 212, 213, and 214. That these gears 212, 213, and 214 may be turned independent of each other a stem 215 extends from the side piece 201, said stem 215 being provided with a socket 216. In this socket 216 is rotatably arranged the end of a stem 217, on which the gear 214 is fixed, said stem having upon its opposite end a finger-piece 218. Upon this stem 217, between the gear 214 and the finger-piece 218, is a sleeve 219, on which the gear 213 is fixed near one end and provided with a finger-piece 220 upon its other end. Upon said sleeve 219, between said gear 213 and said finger-piece 220, is another sleeve, 221, on which the gear 212 is fixed at one end and provided with a finger-piece 222 at its opposite end. This arrangement of these parts permits each to be turned independent from the other, whereby it is possible to set the several dating-disks, as will be evident. Between each pair of consecutive-numbering disks 210 is a ratchet wheel or disk 223, and in engagement with each ratchet wheel or disk 223 is a spring dog or pawl 224, pivoted upon a cross-rod 225 and forced by means of springs 226 in their operative engagement with said ratchet-wheels. The two frame-pieces 200 and 201 are connected by another rod 227, to which is pivoted a link 228, said link being pivoted upon a pin extending from the inner surface of the frame-piece 87. When the said frame 199 is in its normal initial position, the rod 204 bears upon the end portion 230 of a frame 229, oscillating upon a rod 231 and provided with the upwardly-extending portions 232, carrying a smaller frame 233 and an inking-roll 234. Now when the frame 199 is caused to move in an upward direction by means of an offset 235 on the shaft 40 being brought against a stud or projection 236 on said frame 199 (see Figs. 7 and 8) the inking-roll 234 moves down over the printing-disks, supplying them with ink, and then out of the way, thereby permitting the printing-disks to be brought against the under surface of the check-strip 110, as illustrated in Fig. 10, the pawls or dogs 224 acting in the usual manner to turn the numbering-disks 210, that with each movement the numbers are consecutively printed. Other spring dogs or pawls 237, pivotally supported upon a rod 238, prevent the backward movements of said disks 210. In order that the said printing-disks 210 may be reset by means of a finger-piece 239 upon the free end of the rod 206, each disk 210 is made with a chambered portion 240, (see Fig. 27,) in which is a spring-controlled detent 241, which when brought in engagement with a notch 242 causes the said disks 210 to turn with the spindle 206 to reset said disks to their zero-points. The various finger-pieces 218, 220, 222, and 239 are all upon the outer side of the frame-piece 87, the respective sleeves and spindles upon which said finger-pieces are arranged being movably arranged in the respective elongated slots 243 and 244 in the frame-piece 87, as will be seen from an inspection of Figs. 5 and 6. The said frame-piece 87 is also made with an opening 246, and concentric therewith is a pin 247, extending from the frame-piece 86, upon which pin 247 is slipped an inking-roll 245 for inking the printing-disk 118, as shown in Figs. 8 and 9.

The operations of the various devices and mechanisms comprising my novel construction of cash-register will be evident from the hereinabove description of the various devices and their parts.

I am fully aware that changes may be made in the arrangements and combinations of the various devices, as well as in the details of the construction thereof, without departing from the scope of the present invention. Hence I do not limit my invention to the exact arrangements and combinations of the devices and the various mechanisms as described in the foregoing specification and as illustrated in the accompanying drawings, nor do I confine myself to the details of the construction of any of the said devices or the parts thereof.

Having now described my invention, what I claim is—

1. In a cash-register, a main driving-shaft, the actuating hand-levers, a front plate having a series of numerals along which said levers may be moved in accordance with the values to be indicated, and the registering mechanism and gear connected therewith, combined with a ticket-printing mechanism, comprising a set of printing-disks for printing the amount of the sale upon the ticket, a printing-disk bearing the clerk insignia, and another printing-disk bearing on its surface words indicating different sales departments, indicating-drums corresponding and bearing the same indications as said two last-mentioned printing-disks, hand-levers for setting said printing-disks, means between said printing-disks and said indicating-drums for setting the latter simultaneously with said printing-disks, consisting, essentially, of a rod on which said printing-disks are arranged, toothed sectors on said rod, a pivotal stud on the frame of the apparatus, a pair of oscillatory members on said stud having oppositely-placed toothed segmental portions, an intermediate gear between one of the said segmental portions of each oscillatory member and the toothed sectors on said rod, and a gear connected with each indicating-drum with which the other toothed segmental portions of said oscillatory members mesh; substantially as and for the purposes set forth.

2. In a cash-register, a main driving-shaft, the actuating hand-levers, a front plate having a series of numerals along which said levers may be moved in accordance with the values to be indicated, and the registering mechanism and gear connected therewith, combined with a ticket-printing mechanism comprising a set of printing-disks for printing the amount of the sale upon the ticket, a printing-disk bearing the clerk insignia, and another printing-disk bearing on its surface words indicating different sales departments, indicating-drums corresponding and bearing the same indications as said two last-mentioned printing-disks, hand-levers for setting said printing-disks, means between said printing-disks and said indicating-drums for setting the latter simultaneously with said printing-disks, consisting, essentially, of a rod on which said printing-disks are arranged, toothed sectors on said rod, a pivoted stud on the frame of the apparatus, a pair of oscillatory members on said stud having oppositely-placed toothed segmental portions, an intermediate gear between one of the said segmental portions of each oscillatory member and the toothed sectors on said rod, a gear connected with each indicating-drum with which the other toothed segmental portions of said oscillatory members mesh, a star-wheel connected with each gear of said indicating-drums, and a spring-actuated detent engaging with each star-wheel; substantially as and for the purposes set forth.

3. In a cash-register, the combination, with the registering mechanism thereof, of a rod 46, a printing-disk 67, and a toothed sector 70 on said rod, an indicating-drum bearing the same insignia as that of said printing-disk 67, a hand-lever 71 for setting said printing-disk 67, and means between said toothed sector 70 and said indicating-drum for setting the latter simultaneously with said printing-disk; substantially as and for the purposes set forth.

4. In a cash-register, the combination, with the registering mechanism thereof, of a rod 46, a printing-disk 67, and a toothed sector 70 on said rod, an indicating-drum bearing the same insignia as that of said printing-disk 67, a hand-lever 71 for setting said printing-disk 67, means between said toothed sector 70 and said indicating-drum for setting the latter simultaneously with said printing-disk, consisting, essentially, of a pivotal stud on the frame of the apparatus, an oscillatory member 98 on said stud having oppositely-placed toothed segmental portions 99 and 100, a gear 97 in mesh with said sector 70, and an intermediate gear 89 in mesh with said gear 97 and said toothed portion 99, and a pinion 101 connected with said indicating-drum with which said toothed portion 100 is in mesh; substantially as and for the purposes set forth.

5. In a cash-register, the combination, with the registering mechanism thereof, of a rod 46, a printing-disk 67, and a toothed sector 70 on said rod, an indicating-drum bearing the same insignia as that of said printing-disk 67, a hand-lever 71 for setting said printing-disk 67, means between said toothed sector 70 and said indicating-drum for setting the latter simultaneously with said printing-disk, consisting, essentially, of a pivotal stud on the frame of the apparatus, an oscillatory member 98 on said stud having oppositely-placed toothed segmental portions 99 and 100, a gear 97 in mesh with said sector 70, and an intermediate gear 89 in mesh with said gear 97 and said toothed portion 99, a pinion 101 connected with said indicating-drum with which said toothed portion 100 is in mesh, a star-wheel 103 connected with said pinion 101, and a spring-actuated detent engaging with said star-wheel; substantially as and for the purposes set forth.

6. In a cash-register, the combination, with the registering mechanism thereof, of a rod 46, a printing-disk 49, and a toothed sector 51 loosely arranged on said rod, an indicating-drum bearing the same insignia as that of the printing-disk 49, a hand-lever 52 for setting said printing-disk 49, and means between said toothed sector 51 and said indicating-drum for setting the latter simultaneously with said printing-disk; substantially as and for the purposes set forth.

7. In a cash-register, the combination, with the registering mechanism thereof, of a rod 46, a printing-disk 49, and a toothed sector 51 loosely arranged on said rod, an indicating-drum bearing the same insignia as that of the printing-disk 49, a hand-lever 52 for setting said printing-disk 49, means between said toothed sector 51 and said indicating-drum for setting the latter simultaneously with said printing-disk, consisting, essentially, of a pivotal stud on the frame of the apparatus, an oscillatory member 90 on said stud having oppositely-placed toothed segmental portions 91 and 93, a gear 83 in mesh with said sector 51, a spindle 85, a pinion 84 on one end of said spindle in mesh with said gear 83, a second pinion 88 upon the opposite end of said spindle in mesh with the toothed portion 91 of said oscillatory member 90, and a pinion 94 connected with said indicating-drum with which said toothed portion 93 is in mesh; substantially as and for the purposes set forth.

8. In a cash-register, the combination, with the registering mechanism thereof, of a rod 46, a printing-disk 49, and a toothed sector 51 loosely arranged on said rod, an indicating-drum bearing the same insignia as that of the printing-disk 49, a hand-lever 52 for setting said printing-disk 49, means between said toothed sector 51 and said indicating-drum for setting the latter simultaneously with said printing-disk, consisting, essentially, of a pivotal stud on the frame of the apparatus, an oscillatory member 90 on said stud having oppositely-placed toothed segmental portions 91 and 93, a gear 83 in mesh with said sector 51, a spindle 85, a pinion 84 on one end of said spindle in mesh with said gear 83, a second pinion 88 upon the opposite end of said spindle in mesh with the toothed portion 91 of said oscillatory member 90, a pinion 94 connected with said indicating-drum with which said toothed portion 93 is in mesh, a star-wheel 102 connected with said pinion 94, and a spring-actuated detent in engagement with said star-wheel; substantially as and for the purposes set forth.

9. In a cash-register, the combination, with the registering mechanism thereof and a shaft 40, of a rod 46, a printing-disk 67, and a toothed sector 70 on said rod, an indicating-drum bearing the same insignia as that of said printing-disk 67, a hand-lever 71 pivotally connected with said shaft 40, a toothed sector 72 connected with said hand-lever, a pinion 74 in mesh with said sector 72, a gear 75 on said rod 46 in mesh with said pinion 74, all for producing a rotary motion of said rod 46 and setting said printing-disk 67, and means between said toothed sector 70 and said indicating-drum for setting the latter simultaneously with said printing-disk; substantially as and for the purposes set forth.

10. In a cash-register, the combination, with the registering mechanism thereof and a shaft 40, of a rod 46, a printing-disk 67, and a toothed sector 70 on said rod, an indicating-drum bearing the same insignia as that of said printing-disk 67, a hand-lever 71 pivotally connected with said shaft 40, a toothed sector 72 connected with said hand-lever, a pinion 74 in mesh with said sector 72, a gear 75 on said rod 46 in mesh with said pinion 74, all for producing a rotary motion of said rod 46 and setting said printing-disk 67, means between said toothed sector 70 and said indicating-drum for setting the latter simultaneously with said printing-disk, consisting, essentially, of a pivotal stud on the frame of the apparatus, an oscillatory member 98 on said stud having oppositely-placed toothed segmental portions 99 and 100, a gear 97 in mesh with said sector 70, and an intermediate gear 89 in mesh with said gear 97 and said toothed portion 99, and a pinion 101 connected with said indicating-drum with which said toothed portion 100 is in mesh; substantially as and for the purposes set forth.

11. In a cash-register, the combination, with the registering mechanism thereof and a shaft 40, of a rod 46, a printing-disk 67, and a toothed sector 70 on said rod, an indicating-drum bearing the same insignia as that of said printing-disk 67, a hand-lever 71 pivotally connected with said shaft 40, a toothed sector 72 connected with said hand-lever, a pinion 74 in mesh with said sector 72, a gear 75 on said rod 46 in mesh with said pinion 74, all for producing a rotary motion of said rod 46 and setting said printing-disk 67, means between said toothed sector 70 and said indicating-drum for setting the latter simultaneously with said printing-disk, consisting, essentially, of a pivotal stud on the frame of the apparatus, an oscillatory member 98 on said stud having oppositely-placed toothed segmental portions 99 and 100, a gear 97 in mesh with said sector 70, and an intermediate gear 89 in mesh with said gear 97 and said toothed portion 99, a pinion 101 connected with said indicating-drum with which said toothed portion 100 is in mesh, a star-wheel 103 connected with said pinion 101, and a spring-actuated detent engaging with said star-wheel; substantially as and for the purposes set forth.

12. In a cash-register, the combination, with the registering mechanism thereof and a shaft 40, of a rod 46, a printing-disk 49 loosely arranged on said rod, a toothed sector 51 connected with said printing-disk 49, an indicating-drum bearing the same insignia as that of the printing-disk 49, a hand-lever 52 pivotally connected with said shaft 40, a toothed sector 53 connected with said hand-lever, a pinion 55 in mesh with said sector 53, a gear 56 also loosely arranged on said rod 46 in mesh with said pinion 55, all for producing a rotary motion of said sector 51 and setting said printing-disk 49, and means between said toothed sector 51 and said indicating-drum for setting the latter simultaneously with said printing-disk; substantially as and for the purposes set forth.

13. In a cash-register, the combination, with the registering mechanism thereof and a shaft 40, of a rod 46, a printing-disk 49 loosely arranged on said rod, a toothed sector 51 connected with said printing-disk 49, an indicating-drum bearing the same insignia as that of the printing-disk 49, a hand-lever 52 pivotally connected with said shaft 40, a toothed sector 53 connected with said hand-lever, a pinion 55 in mesh with said sector 53, a gear 56 also loosely arranged on said rod 46 in mesh with said pinion 55, all for producing a rotary motion of said sector 51 and setting said printing-disk 49, means between said toothed sector 51 and said indicating-drum for setting the latter simultaneously with said printing-disk, consisting, essentially, of a pivotal stud on the frame of the apparatus, an oscillatory member 90 on said stud having oppositely-placed toothed segmental portions 91 and 93, a gear 83 in mesh with said sector 51, a spindle 85, a pinion 84 on one end of said spindle in mesh with said gear 83, a second pinion 88 upon the opposite end of said pinion in mesh with the toothed portion 91 of said oscillatory member 90, and a pinion 94 connected with said indicating-drum with which said toothed portion 93 is in mesh; substantially as and for the purposes set forth.

14. In a cash-register, the combination, with the registering mechanism thereof and a shaft 40, of a rod 46, a printing-disk 49 loosely arranged on said rod, a toothed sector 51 connected with said printing-disk 49, an indicating-drum bearing the same insignia as that of the printing-disk 49, a hand-lever 52 pivotally connected with said shaft 40, a toothed sector 53 connected with said hand-lever, a pinion 55 in mesh with said sector 53, a gear 56 also loosely arranged on said rod 46 in mesh with said pinion 55, all for producing a rotary motion of said sector 51 and setting said printing-disk 49, means between said toothed sector 51 and said indicating-drum for setting the latter simultaneously with said printing-disk, consisting, essentially, of a pivotal stud on the frame of the apparatus, an oscillatory member 90 on said stud having oppositely-placed toothed segmental portions 91 and 93, a gear 83 in mesh with said sector 51, a spindle 85, a pinion 84 on one end of said spindle in mesh with said gear 83, a second pinion 88 upon the opposite end of said pinion in mesh with the toothed portion 91 of said oscillatory member 90, a pinion 94 connected with said indicating-drum with which said toothed portion 93 is in mesh, a star-wheel 102 connected with said pinion 94, and a spring-actuated detent in engagement with said star-wheel; substantially as and for the purposes set forth.

15. In a cash-register, the combination with the registering mechanism thereof, of a set of printing-disks, a check-feeding device, a cutter for severing the printed check and a downwardly-extending check-delivery chute between said cutter and printing-disks, and an arm movably arranged above said printing-disks having an ejecting-finger for ejecting the printed card and said finger forming a stop to limit the forward movement of the check; substantially as and for the purposes set forth.

16. In a cash-register, the combination with the registering mechanism thereof, of a set of printing-disks, a check-feeding device, a cutter for severing the printed check and a downwardly-extending check-delivery chute between said cutter and printing-disks, a pivotally arranged frame adapted to move above said printing-disks, an arm connected with said frame, and a finger on said arm having its free end extending between a pair of said printing-disks and forming a stop to limit the forward movement of the check and arranged to eject the printed check; substantially as and for the purposes set forth.

17. In a cash-register, the combination with the registering mechanism thereof, of a set of printing-disks, a check-feeding device, a cutter for severing the printed check and a downwardly-extending check-delivery chute between said cutter and printing-disks, a pivotally-arranged and spring-controlled frame adapted to move above said printing-disk, an arm connected with said frame, and a finger on said arm having its free end extending between a pair of said printing-disks and forming a stop to limit the forward movement of the check and arranged to eject the printed check; substantially as and for the purposes set forth.

18. In a cash-register, the combination with the registering mechanism thereof, of a set of printing-disks, a check-feeding device, a cutter for severing the printed check, an inking-pad movably arranged above said printing-disks, and an arm extending over said inking-pad having an ejecting-finger for ejecting the printed check; substantially as and for the purposes set forth.

19. In a cash-register, the combination with the registering mechanism thereof, of a set of printing-disks, a check-feeding device, a cutter for severing the printed check and a downwardly-extending check-delivery chute between said cutter and printing-disks, a pivotally-arranged frame adapted to move above said printing-disks, an inking-pad in said frame, an arm connected with said frame and extending over said inking-pad, and a finger on said arm having its free end extending between a pair of said printing-disks and forming a stop to limit the forward movement of the check and for ejecting the printed check; substantially as and for the purposes set forth.

20. In a cash-register, the combination with the registering mechanism thereof, of a set of printing-disks, a check-feeding device, a cutter for severing the printed check and a downwardly-extending check-delivery chute between said cutter and printing-disks, a pivotally-arranged and spring-controlled frame adapted to move above said printing-disks, an inking-pad in said frame, an arm connected with said frame and extending over said inking-pad, and a finger on said arm having its free end extending between a pair of said printing-disks and forming a stop to limit the forward movement of the check and for ejecting the printed check; substantially as and for the purposes set forth.

21. In a cash-register, the combination, with a check-feeding mechanism, of a guide device 117 through which the check is passed, comprising, pairs of guide-bars at the ends of said device, and a spring-controlled and soft flexible backing beneath which the check is passed; substantially as set forth.

22. In a cash-register, the combination, with a check-feeding mechanism, of a guide device 117 through which the check is passed, comprising, pairs of guide-bars at the ends of said device, some of said guide-bars being provided with shoulders, a soft flexible backing arranged upon said shoulders, and a spring-plate on said guide-bars and arranged against the back of said backing; substantially as set forth.

23. In a cash-register, the combination, with a check-feeding mechanism, of a guide device 117 through which the check is passed, comprising, pairs of guide-bars at the ends of said device, some of said guide-bars being provided with shoulders, a soft flexible backing arranged upon said shoulders, a spring-plate on said guide-bars and arranged against the back of said backing, and screws at each end of said spring-plate for varying the tension of said plate upon said flexible backing; substantially as set forth.

24. In a cash-register, the combination, with the registering mechanism thereof and a fixed arm 195 provided with a laterally-extending pin, of a pivoted cradle carrying a spindle 190, a ratchet-wheel on said spindle and a roll of tape, an oscillating arm at the side of said cradle, a slotted extension on said arm movably arranged over the pin on said arm 195, and a dog on said oscillating arm in engagement with said ratchet on said spindle 190, the shaft 37, and means on said shaft for causing two downward movements of said cradle during each revolution of said shaft; substantially as set forth.

25. In a cash-register, the combination, with the registering mechanism thereof and a fixed arm 195 provided with a laterally-extending pin, of a pivoted cradle carrying a spindle 190, a ratchet-wheel on said spindle and a roll of tape, an oscillating arm at the side of said cradle, a slotted extension on said arm movably arranged over the pin on said arm 195, and a dog on said oscillating arm in engagement with said ratchet on said spindle 190, the shaft 37, means on said shaft for causing two downward movements of said cradle during each revolution of said shaft, consisting, essentially, of a cam on said shaft having oppositely-extending wings, and a device on the side of said cradle with which said wings are successively brought in operative sliding engagement; substantially as set forth.

26. In a cash-register, the combination, with the registering mechanism thereof and a fixed arm 195 provided with a laterally-extending pin, of a pivoted cradle carrying a spindle 190, a ratchet-wheel on said spindle and a roll of tape, an oscillating arm at the side of said cradle, a slotted extension on said arm movably arranged over the pin on said arm 195, and a dog on said oscillating arm in engagement with said ratchet on said spindle 190, the shaft 37, means on said shaft for causing two downward movements of said cradle during each revolution of said shaft, consisting, essentially, of a cam on said shaft having oppositely-extending wings, and a roller on the side of said cradle with which said wings are successively brought in operative sliding engagement; substantially as set forth.

27. In a cash-register, the combination, with the registering mechanism thereof and a fixed arm 195 provided with a laterally-extending pin, of a pivoted cradle, a spindle 190 in said cradle, a ratchet-wheel and a roll of tape on said spindle, and a spring connected with said cradle for causing it to remain raised when in its normal initial position, an oscillating arm at the side of said cradle, a slotted extension on said arm movably arranged over the pin on said arm 195, and a dog on said oscillating arm in engagement with said ratchet on said spindle 190, a shaft 37, and means on said shaft for causing two downward movements of said cradle during each revolution of said shaft; substantially as set forth.

28. In a cash-register, the combination, with the registering mechanism thereof, and a fixed arm 195 provided with a laterally-extending pin, of a pivoted cradle, a spindle 190 in said cradle, a ratchet-wheel and a roll of tape on said spindle, and a spring connected with said cradle for causing it to remain raised when in its normal initial position, an oscillating arm at the side of said cradle, a slotted extension on said arm movably arranged over the pin on said arm 195, and a dog on said oscillating arm in engagement with said ratchet on said spindle 190, a shaft 37, means on said shaft for causing two downward movements of said cradle during each revolution of said shaft, consisting, essentially, of a cam on said shaft having oppositely-extending wings, and a device on the side of said cradle with which said wings are successively brought in operative sliding engagement; substantially as set forth.

29. In a cash-register, the combination, with the registering mechanism thereof and a fixed arm 195 provided with a laterally-extending pin, of a pivoted cradle, a spindle 190 in said cradle, a ratchet-wheel and a roll of tape on said spindle, and a spring connected with said cradle for causing it to remain raised when in its normal initial position, an oscillating arm at the side of said cradle, a slotted extension on said arm movably arranged over the pin on said arm 195, and a dog on said oscillating arm in engagement with said ratchet on said spindle 190, a shaft 37, means on said shaft for causing two downward movements of said cradle during each revolution of said shaft, consisting, essentially, of a cam on said shaft having oppositely-extending wings, and a roller on the side of said cradle with which said wings are successively brought in operative sliding engagement; substantially as set forth.

30. In a cash-register, the combination, with the registering mechanism thereof, of a pivoted cradle, spindles 189 and 190 in said cradle, said spindle 189 having a roll of tape adapted to be unreeled therefrom and reeled upon said spindle 190, means connected with said spindle 190 for causing an intermittent rotary motion of said spindle, comprising a ratchet-wheel on said spindle, an oscillating arm on said spindle, a spring-dog on said arm in engagement with said ratchet-wheel, an extension on said arm provided with an opening, and a stud projecting from the side of said cradle into the opening in said extension for producing an oscillatory motion of said arm; substantially as set forth.

31. In a cash-register, the combination, with the registering mechanism thereof, of a pivoted cradle, spindles 189 and 190 in said cradle, said spindle 189 having a roll of tape adapted to be unreeled therefrom and reeled upon said spindle 190, means connected with said spindle 190 for causing an intermittent rotary motion of said spindle, comprising a ratchet-wheel on said spindle, an oscillating arm on said spindle, a spring-dog on said arm in engagement with said ratchet-wheel, an extension on said arm provided with an opening, and a stud projecting from the side of said cradle into the opening in said extension for producing an oscillatory motion of said arm, and a second spring-actuated dog at the side of said cradle to prevent a rearward movement of said ratchet-wheel; substantially as set forth.

32. In a cash-register, the combination, with the registering mechanism thereof, of a set of printing-disks, a ticket-feeding device, a frame and arm movably arranged above said printing-disks, a ticket-ejecting finger connected with said arm, and means for actuating and moving said arm and finger, consisting, essentially, of an oscillating arm 169, a link connection between the lower end portion of said arm 169 and the said frame and arm, a shaft 40, a cam on said shaft, said cam having a straight edge 166, a curved edge 167, and an offset 168, and the upper end portion of said arm 169 being provided with a straight edge 170 normally in contact with the straight edge 166, said arm 169 being also provided with an edge 175 adapted to be brought in engagement with said offset 168 to produce a short jerking movement of the ticket-ejecting finger; substantially as set forth.

33. In a cash-register, the combination, with the registering mechanism thereof, of a set of printing-disks, a ticket-feeding device, a frame and arm movably arranged above said printing-disks, a ticket-ejecting finger connected with said arm, and means for actuating and moving said frame, consisting, of an oscillating arm 169, having a lower end portion 173, a spring 172 attached to said end portion, a link 174 also connected to said arm 169, a pin 163, and a link pivotally arranged upon said pin 163, said link having one portion connected with said frame above the printing-disks, and having another portion connected with said link 174, a shaft 40, and a cam on said shaft in engagement with the upper end portion of said arm 169; substantially as set forth.

34. In a cash-register, the combination, with the registering mechanism, thereof, of a set of printing-disks, a ticket-feeding device, a frame and arm movably arranged above said printing-disks, a ticket-ejecting finger connected with said arm, and means for actuating and moving said frame, consisting, of an oscillating arm 169, having a lower end portion 173, a spring 172 attached to said end portion, a link 174 also connected to said arm 169, a pin 163, and a link pivotally arranged upon said pin 163, said link having one portion connected with said frame above the printing-disks, and having another portion connected with said link 174, a shaft 40, and a cam on said shaft, said cam having a straight edge 166, a curved edge 167, and an offset 168, and the upper end portion of said arm 169 being provided with a straight edge 170 normally in contact with the straight edge 166, said arm 169 being also provided with an edge 175 adapted to be brought in engagement with said offset 168 to produce a short jerky movement of the ticket-ejecting finger; substantially as set forth.

35. In a cash-register, the combination, with the registering mechanism thereof, of a set of printing-disks, a ticket-feeding device, and means for severing a ticket, and a downwardly-extending delivery-chute directly back of said printing-disks and in front of said ticket-severing means; substantially as set forth.

36. In a cash-register, the combination, with the registering mechanism thereof, of a set of printing-disks, a ticket-feeding device, and means for severing a ticket, a downwardly-extending delivery-chute directly back of said printing-disks and in front of said ticket-severing means, and means arranged above said printing-disks for ejecting the printed ticket into said chute; substantially as set forth.

37. In a cash-register, the combination, with the registering mechanism thereof, of a set of printing-disks, a ticket-feeding device, means for severing a ticket, a downwardly-extending delivery-chute directly back of said printing-disks and in front of said ticket-severing means, means arranged above said printing-disks for ejecting the printed ticket into said chute, consisting of an arm 155 having an ejecting-finger, and means for producing a movement of said arm; substantially as set forth.

38. In a cash-register, the combination, with the registering mechanism thereof, of a set of printing-disks, a ticket-feeding device, means for severing a ticket, a downwardly-extending delivery-chute directly back of said printing-disks and in front of said ticket-severing means, means arranged above said printing-disks for ejecting the printed ticket into said chute, consisting of an arm 155 having an ejecting-finger, means for producing a movement of said arm, comprising, an oscillating arm 169, a link connection between the lower end portion of said arm 169 and said arm 155, a shaft 40, and a cam on said shaft, in engagement with the upper end portion of said arm 169; substantially as set forth.

39. In a cash-register, the combination, with the registering mechanism thereof, of a set of printing-disks, a ticket-feeding device, means for severing a ticket, a delivery-chute directly back of said printing-disks, means arranged above said printing-disks for ejecting the printed ticket into said chute, consisting of an arm 155 having an ejecting-finger, means for producing a movement of said arm, comprising, an oscillating arm 169, a link connection between the lower end portion of said arm 169 and said arm 155, a shaft 40, a cam on said shaft, said cam having a straight edge 166, a curved edge 167, and an offset 168, and the upper end portion of said arm 169 being provided with a straight edge 170 normally in contact with the straight edge 166, said arm 169 being also provided with an edge 175 adapted to be brought in engagement with said offset 168 to produce a short jerky movement of the ticket-ejecting finger; substantially as set forth.

40. In a cash-register, the combination, with the main actuating-shaft and the registering mechanism, of a frame 199 having a front wall 203, said frame being pivotally connected with said shaft, means for raising and lowering said frame, printing-wheels in said frame, a second pivoted frame 229 having an end portion 230, a rod 204 in said frame 199 in its normal initial position in engagement with said end portion 230, and an inking-roll in said frame 229 movable over said printing-wheels; substantially as set forth.

41. In a cash-register, the combination, with the main actuating-shaft and the registering mechanism, of a frame 199 having a front wall 203, said frame being pivotally connected with said shaft, means for raising and lowering said frame, printing-wheels in said frame, a rod 231, a frame 229 pivotally arranged on said rod 231, an end portion 230 on said frame 229, and a rod 204 on said frame 199 in its normal initial position in engagement with said end portion 230, an upwardly-extending portion 232 on said frame, a smaller frame 233 carried by said portion 232, and an inking-roll 234 in said frame 233 movable over said printing-wheels; substantially as set forth.

42. In a printing attachment for cash-registers, the combination with a series of type-carriers, means for feeding a check-strip over the same, and means for severing the check, of a movable device carrying means for inking said carriers, and a check-ejector operated by said movable device.

43. In a printing attachment for cash-registers, the combination with a series of type-carriers, means for feeding a check-strip over the same, and means for severing the check, of an ink-pad holder, and a check-ejector mounted upon said holder.

44. In a printing attachment for cash-registers, the combination with a series of type-carriers, means for feeding a check-strip over the same, and means for severing the check, of an ink-pad holder for inking said carriers, a check-ejector mounted upon said holder, and means for giving said holder a quick impulse to cause said ejector to eject the check.

45. In a printing attachment for cash-registers, the combination with a series of type-carriers, means for feeding a check-strip over the same, and means for severing the check, of an ink-pad holder for inking said carriers, a check-ejector operated by said holder and having provisions for limiting the movement of the check in the direction of the feed, and means for giving said holder a quick impulse to impart to the check-ejector a sudden check-ejecting movement.

46. In a printing attachment for cash-registers, the combination with a series of type-carriers, means for feeding a check-strip over the same, and means for severing the check, of an ink-pad holder for inking said carriers, a check-ejector mounted upon said holder and having provisions for limiting the movement of the check in the direction of its feed, a check-chute positioned below the severing-point of the check, and means for giving the holder and check-ejector a sudden impulse to throw said check into said chute.

Signed at Newark, in the county of Essex and State of New Jersey, this 11th day of April, A. D. 1903.

ALBERT PFAFF.

Witnesses:
FREDK. C. FRAENTZEL,
GEO. D. RICHARDS.